US008193471B2

(12) United States Patent
Wang

(10) Patent No.: US 8,193,471 B2
(45) Date of Patent: Jun. 5, 2012

(54) BREADMAKER WITH A HIDDEN HEATING ELEMENT

(75) Inventor: Dong-Lei Wang, Zhuhai (CN)

(73) Assignee: Vesta Electrical Appliance Manufacturing (Zhongshan) Co., Ltd., Zhongshan, Guangdong Province (CN)

( * ) Notice: Subject to any disclaimer, the term of this patent is extended or adjusted under 35 U.S.C. 154(b) by 950 days.

(21) Appl. No.: 12/201,684

(22) Filed: Aug. 29, 2008

(65) Prior Publication Data

US 2009/0071950 A1 Mar. 19, 2009

(30) Foreign Application Priority Data

Sep. 14, 2007 (CN) .......................... 2007 2 0175963

(51) Int. Cl.
*A47J 27/00* (2006.01)
*A47J 37/00* (2006.01)
*A47J 37/01* (2006.01)
(52) U.S. Cl. ........... 219/429; 219/433; 219/436; 99/348
(58) Field of Classification Search ........................ None
See application file for complete search history.

(56) References Cited

U.S. PATENT DOCUMENTS

| 3,602,692 | A | * | 8/1971 | Morey | 219/535 |
| 5,392,695 | A | * | 2/1995 | Junkel | 99/328 |
| 5,901,637 | A | * | 5/1999 | Glucksman et al. | 99/326 |
| 2012/0017777 | A1 | * | 1/2012 | Wang | 99/426 |

* cited by examiner

*Primary Examiner* — Joseph M Pelham
(74) *Attorney, Agent, or Firm* — Morris Manning & Martin LLP; Tim Tingkang Xia Esq.

(57) ABSTRACT

The present invention relates to a breadmaker, in which the heating element is shieldingly protected in the shell body without being exposed outside so as to prevent people's hand from touching and being hurt by the heating element, more important, it is able to avoid getting flour falling onto the heating element and being baked excessively to stick on the heating element which may lead to a fire, thus the breadmaker of the present invention is more safely to operate and conforms to the requirements of European safety standards. The breadmaker comprises a shielding member for the heating element, and the shielding member is disposed between the heating element and the upper opening of the bread vessel, the downward projection of the shielding member can completely cover the contour of the heating element so as to completely shield the heating element from the above.

9 Claims, 5 Drawing Sheets

BREADMAKER WITH A HIDDEN HEATING ELEMENT

CROSS-REFERENCE TO RELATED PATENT APPLICATION

This non-provisional application claims priority under 35 U.S.C. §119(a) on Patent Application No(s). 200720175963.0 filed in China, P.R.C. on Sep. 14, 2007 the entire contents of which are hereby incorporated by reference.

FIELD OF THE INVENTION

The present invention relates to a breadmaker, more particularly, to a breadmaker with a hidden heating element, in which the heating element is shielded in the shell body without being exposed outside.

BACKGROUND OF THE INVENTION

Breadmaker of prior art comprises a shell body, a case body disposed inside the shell body, a lid disposed on top of the shell body; wherein said lid, case body and shell body are enclosed to form a sealed bread-making chamber; a bread vessel is disposed inside said bread-making chamber, a mixing mechanism passes through the wall of the bread vessel with mixing blades disposed in the bread vessel for mixing; a heating element is disposed outside the bread vessel and inside said bread-making chamber; the mixing mechanism is fixed inside said shell body by means of baseplate assembly which is disposed at the bottom of the shell body; and the mixing mechanism is driven to work by a transmission mechanism from a motor which is disposed outside said bread-making chamber.

At present, heating elements of all breadmakers are exposed in the shell body, that is, the upper portion of the heating element is directly exposed in said bread-making chamber. There is a possibility that a user's hand gets hurt by unintentionally touching the heating element when using the breadmaker. In process of making bread, a small portion of flour or other food may fly in air during mixing by mixing blades, or the flour may get ferment with increased volume to overflow if the user does not add flour in accordance with recipe, as a result, the flour or other food may easily fall onto the heating element and get baked excessively to stick on the outer wall of the heating element which may lead to a fire bringing the user a potential safety risk.

In order to ensure the user's safety, European safety standards regulate a series of rules, however, the breadmaker of prior art is not able to pass the European safety standard tests. Therefore, improvements are needed to be made on structure.

SUMMARY OF THE INVENTION

The present invention relates to a breadmaker, in which the heating element is shieldingly protected in the shell body without being exposed outside so as to prevent people's hand from touching and being hurt by the heating element, more important, it is able to avoid getting flour falling onto the heating element and being baked excessively to stick on the heating element which may lead to a fire, thus the breadmaker of the present invention is more safely to operate and conforms to the requirements of European safety standards.

The goal of the present invention is achieved by the following technical scheme:

A breadmaker with a hidden heating element comprising a shell body, a case body disposed inside the shell body, a lid disposed on top of the shell body; wherein said lid, case body and shell body are enclosed to form a sealed bread-making chamber; a bread vessel with an upper opening is disposed inside said bread-making chamber of the breadmaker, and a heating element is disposed outside the bread vessel; said heating element in ring shape is disposed below the upper opening of the bread vessel; and wherein said breadmaker further comprises a shielding member for said heating element, and said shielding member is disposed between the heating element and the upper opening of the bread vessel, the downward projection of said shielding member can completely cover the contour of the heating element so as to completely shield the heating element from the above.

Wherein said heating element is selected from the group consisting of a heating tube, a quartz infrared tube, a ceramic heating tube and a PTC (Positive Temperature Coefficient) electric heater.

In summary, the present invention has the following advantages:

The breadmaker of the present invention further comprises a shielding member for said heating element and the heating element is selected from the group consisting of a heating tube, a quartz infrared tube, a ceramic heating tube and a PTC (Positive Temperature Coefficient) electric heater, thereby the heating element can be hidden and protected by the shielding member, besides there is no affect on operations of putting in or taking out of the bread vessel. The present invention is able to prevent people's hand from touching and being hurt by the heating element, and it is also able to avoid getting flour falling onto the heating element and being baked excessively to stick on the heating element which may lead to a fire, which avoids potential safety risk to user. The breadmaker of the present invention is more safely to operate and conforms to the requirements of European safety standards.

BRIEF DESCRIPTION OF THE DRAWINGS

Further features and advantages of the breadmaker of the present invention will become apparent from the following detailed description, in combination with the appended drawings, in which.

Figure 1:
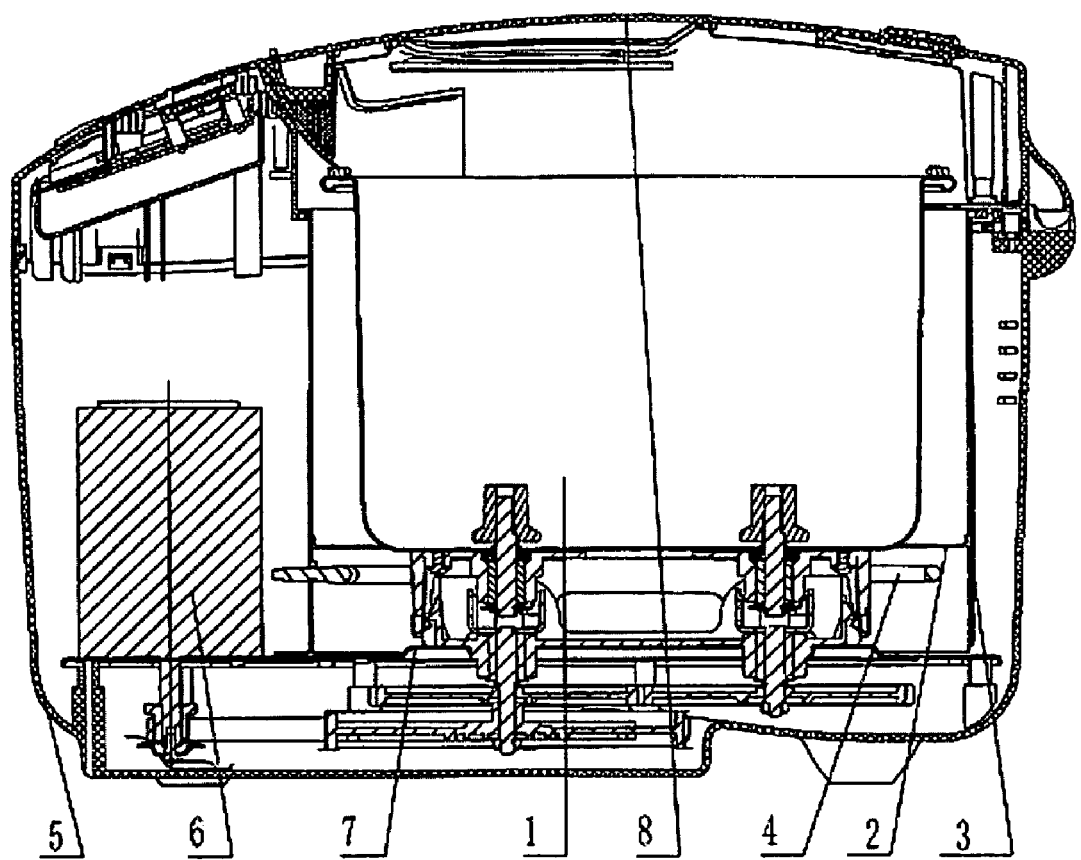
FIG. 1 is a schematic transversal cross-section view of the breadmaker with a hidden heating element according to embodiment 1 of the present invention.

in which: 1 denotes a bread vessel; 2 denotes a shielding protection plate; 21 denotes a bolt; 3 denotes a case body; 31 denotes a ring-shaped groove; 4 denotes a heating element; 40 denotes a heating element joint; 41 denotes a fixing plate for heating element; 42 denotes a fixing metal sheet; 43 denotes a fixing ceramic block; 5 denotes a shell body; 6 denotes a motor; 7 denotes a baseplate assembly; 8 denotes a lid; 9 denotes an upper case body; 10 denotes a lower case body.

DETAILED DESCRIPTION OF THE INVENTION

Embodiment 1:

As illustrated in FIGS. 1, 2, 3 and 4, as a technical solution to solve the technical problem, in the embodiment 1 of the present invention, a shielding protection plate 2 is disposed inside the case body 3 by means of welding, bolt fixing, etc., so that the heating element 4 in the case body 3 is shieldingly protected from being exposed outside, without any affect on the operations of putting in or taking out of the bread vessel. Thereby it is able to prevent people's hand from touching and being hurt by the heating element, and to avoid getting articles, such as the flour, directly falling onto the heating element which may lead to a fire, so as to solve the technical problem.

As illustrated in FIGS. 1, 2, 3 and 4, said bread vessel 1 is disposed inside the case body 3, and said heating element 4 is disposed surrounding the outside of the bread vessel 1 at a level between the bottom of the bread vessel 1 and its upper opening; said shielding member is a ring shaped shielding protection plate 2 which is fixed on the inner wall of the case body 3, above the heating element 4 and surrounding the outside of the bread vessel 1; a clearance is formed between the inner rim of said shielding protection plate 2 and the outer wall of the bread vessel 1.

Figure 2:
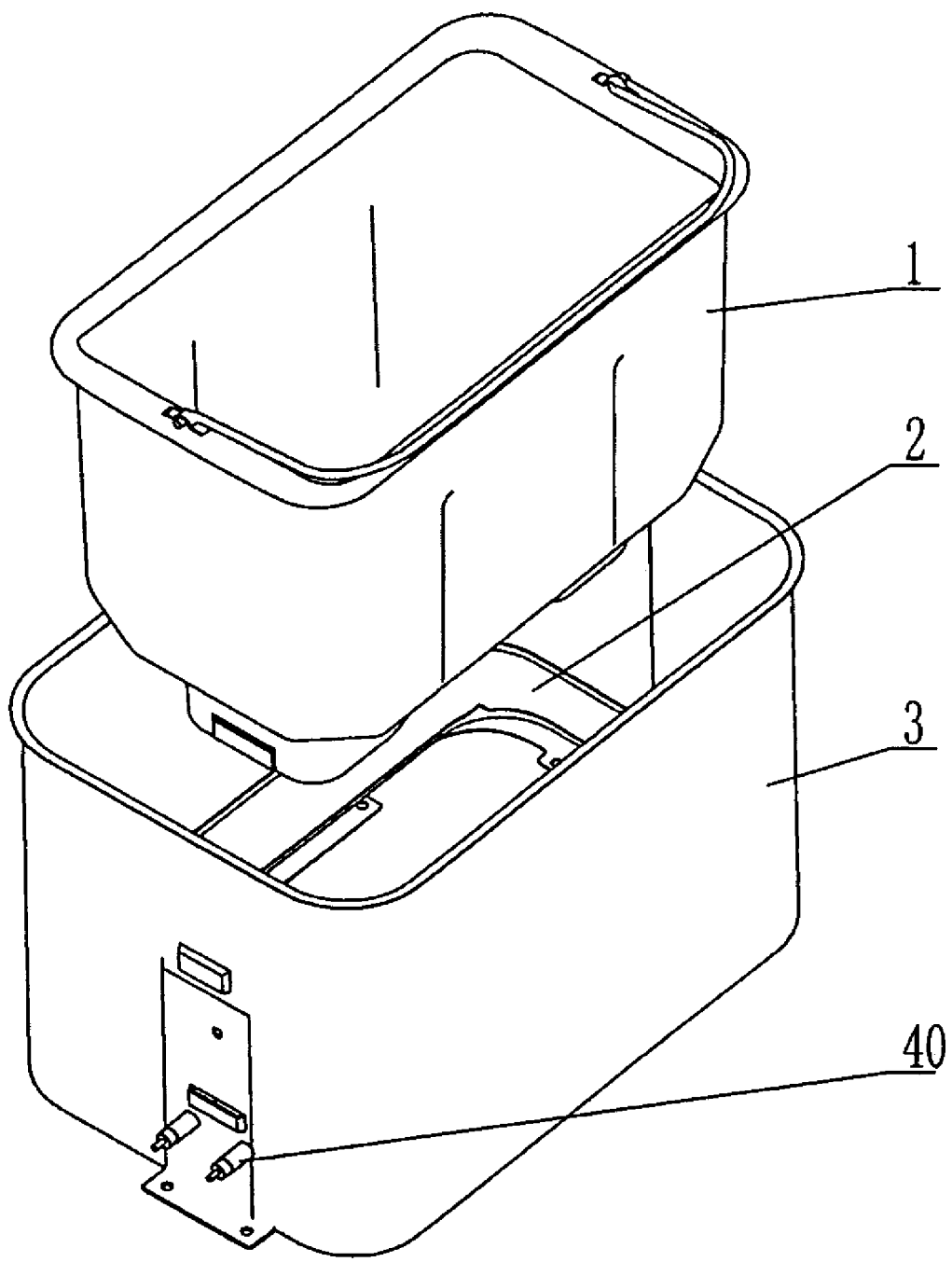
FIG. 2 is a schematic exploded perspective view of the breadmaker with a hidden heating element according to embodiment 1 of the present invention, which comprises a case body, a heating element and a bread vessel.
Figure 3:
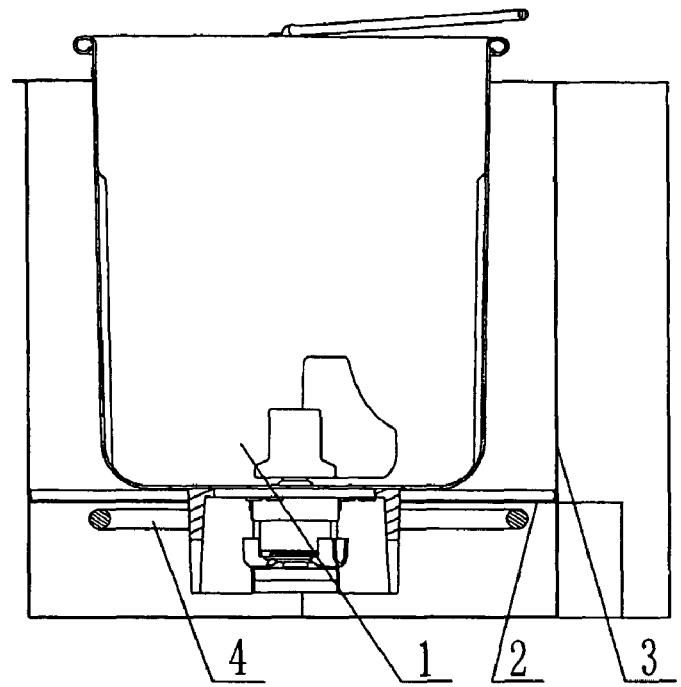
FIG. 3 is a schematic longitudinal cross-section view of the breadmaker with a hidden heating element according to embodiment 1 of the present invention, which comprises a case body, a heating element and a bread vessel.
Figure 4:
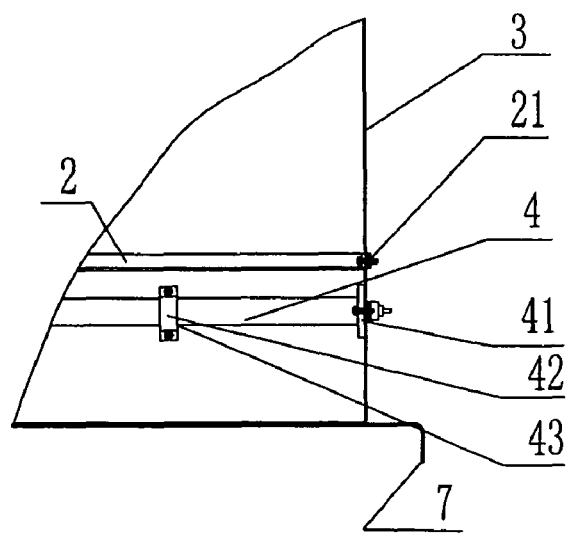
FIG. 4 is an enlarged partial view of FIG. 2 showing the fixing structure for the shielding protection plate and for the heating element.

As illustrated in FIGS. 2 and 4, a joint 40 of said heating element 4 passes through the side wall of the case body 3 to connect with an external circuit; a fixing plate 41 for the heating element 4 is disposed on the inner side wall of the case body 3 at the place where the heating element joint 40 passes through. Said breadmaker further comprises at least one set of fixture for said heating element 4; and said fixture set comprises a fixing metal sheet 42 in shape of "Ω" and a fixing ceramic block 43, wherein the fixing metal sheet 42 is sleeved outside the heating element 4 and fixed with the case body 3, and the ceramic block 43 is disposed between the heating element 4 and the inner side wall of the case body 3.

The cross section of said shielding protection plate 2 is in shape of "L", that is, the shielding protection plate 2 comprises a horizontal ring sheet and a vertical ring sheet; said vertical ring sheet is fixed on the inner side wall of the case body 3 by means of a plurality of bolts 21; and the downward projection of said horizontal ring sheet is able to completely cover the horizontal section of said heating element 4.

Said shielding protection plate 2 just completely covers the heating element 4, without any affect on the operations of putting in or taking out of the bread vessel 1. Thereby it is able to prevent people's hand from touching and being hurt by the heating element, and to avoid getting articles, such as the flour, directly falling onto the heating element which may lead to a fire, so as to solve the technical problem.

Figure 5:
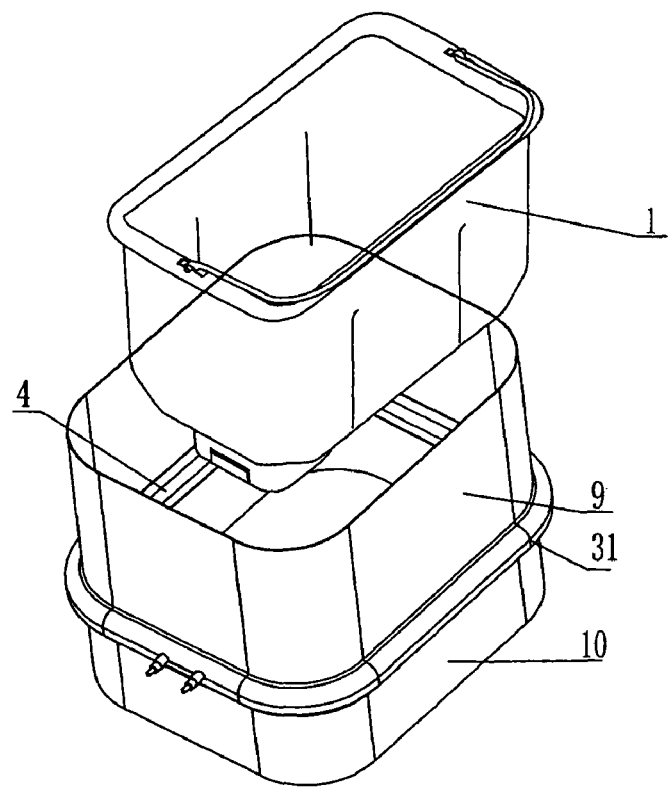
FIG. 5 is a schematic exploded perspective view of the breadmaker with a hidden heating element according to embodiment 2 of the present invention, which comprises a case body, a heating element and a bread vessel.
Figure 6:
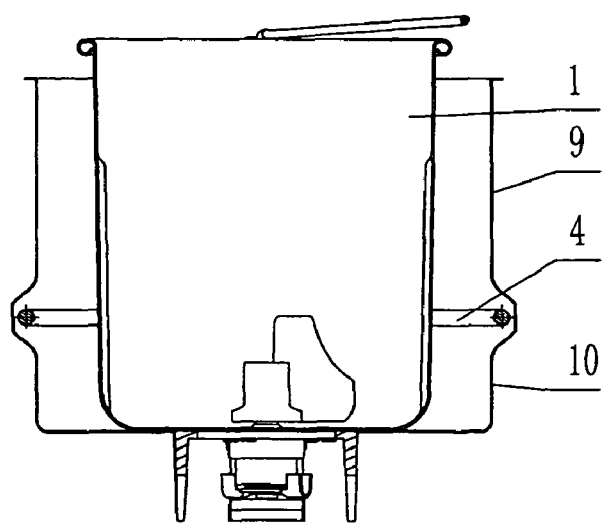
FIG. 6 is a schematic longitudinal cross-section view of the breadmaker with a hidden heating element according to embodiment 2 of the present invention, which comprises a case body, a heating element and a bread vessel.
Figure 7:
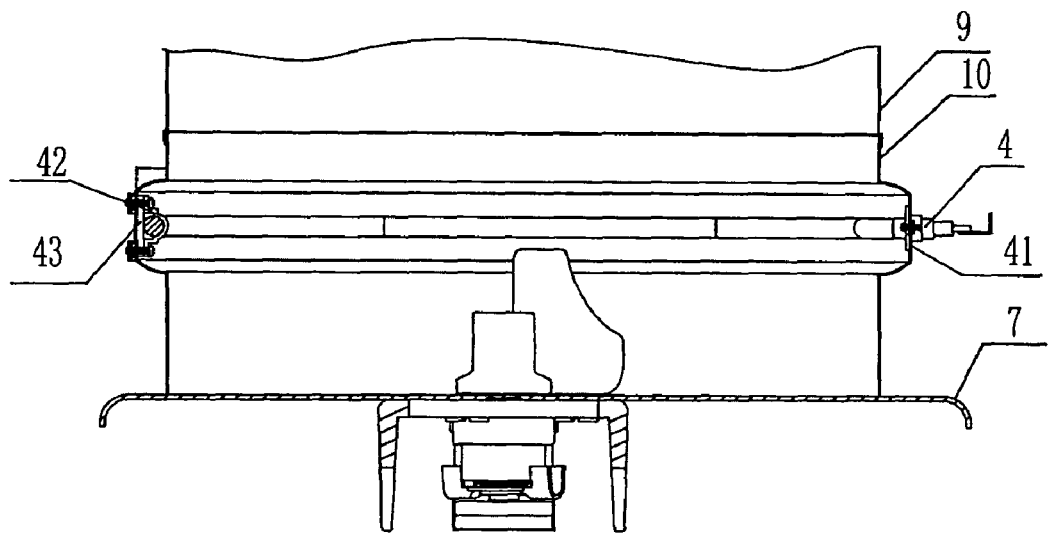
FIG. 7 is an enlarged partial view of FIG. 5 showing the fixing structure for the heating element.

Embodiment 2:

As illustrated in FIGS. 5, 6 and 7, as a technical solution to solve the technical problem, in the embodiment 2 of the present invention, the case body 3 of the breadmaker is segemented, wherein a concave groove is formed horizontally on the inner periphery of the side wall of the case body 3, the heating element is disposed inside the groove so that the heating element 4 is hidden in the groove without being exposed on the inner wall of the case body, which enables convenient operations of putting in or taking out of the bread vessel 1, meanwhile it is able to prevent people's hand from touching and being hurt by the heating element, and to avoid getting articles, such as the flour, directly falling onto the heating element which may lead to a fire, so as to solve the technical problem.

Said bread vessel 1 is disposed inside the case body 3, and said heating element 4 is disposed surrounding the outside of the bread vessel 1 at a level between the bottom of the bread vessel 1 and its upper opening; said shielding member is a ring-shaped concave groove 31 which is formed on the side wall of the case body 3 and bulges outwards therefrom, said heating element 4 is inlaid in the ring-shaped groove 31; and the horizontal groove depth of the ring-shaped groove 31 is larger than the outside diameter of the heating element 4.

The center lines of said heating element 4 and ring-shaped groove 31 are both on a horizontal plane.

According to the embodiment 2 as illustrated FIG. 7, the case body 3 is segmented into two portions as an upper case body 9 and a lower case body 10, said ring-shaped groove 31 is formed on the lower case body 10 adjacent to the connecting position between the upper case body 9 and the lower case body 10.

The heating element 4 is disposed in the ring-shaped groove 31 of the case body 3, so that the heating element in case body is protected by shielding.

As illustrated in FIG. 7, a joint 40 of said heating element 4 passes through the side wall of the ring-shaped groove 31 to connect with an external circuit; a fixing plate 41 for the heating element 4 is disposed on the inner side wall of the ring-shaped groove 31 at the place where the heating element joint 40 passes through; and said breadmaker further comprises at least one set of fixture for said heating element 4; and said fixture set comprises a fixing metal sheet 42 in shape of "Ω" and a fixing ceramic block 43, wherein the fixing metal sheet 42 is sleeved outside the heating element 4 and fixed with the ring-shaped groove 31, and the ceramic block 43 is disposed between the heating element 4 and the inner side wall of the ring-shaped groove 31.

Figure 8:
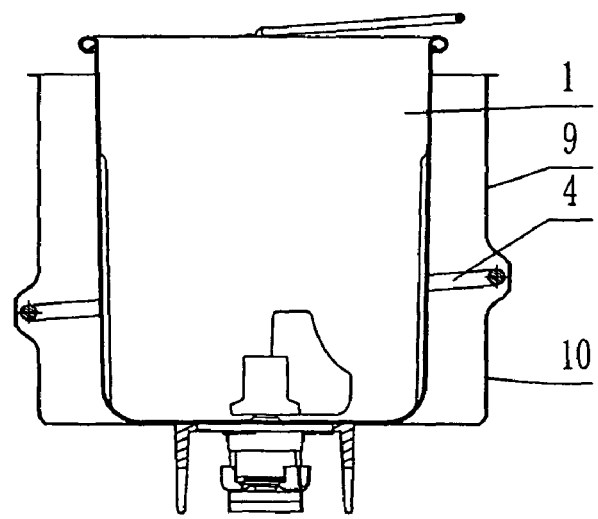
FIG. 8 is a schematic longitudinal cross-section view of the breadmaker with a hidden heating element according to embodiment 3 of the present invention, which comprises a case body, a heating element and a bread vessel.

Embodiment 3:

As illustrated in FIG. 8, the embodiment 3 differentiates from the embodiment 2 in that: the center lines of said heating element 4 and ring-shaped groove 31 are both on an inclined plane which intersects with the horizontal plane, an angle in the range of 5 to 60 degrees is formed between said inclined plane and horizontal plane.

Because the heating element 4 is tilted, the length of the heating element 4 is increased, thereby the bread vessel 1 can be heated more evenly with better effect.

In the above embodiments, said heating element is selected from the group consisting of a heating tube, a quartz infrared tube, a ceramic heating tube and a PTC (Positive Temperature Coefficient) electric heater.

The above descriptions and illustrations should not be construed as limiting the scope of the present invention, which is defined by the appended claims. Various modifications, alternate constructions and equivalents, such as changes on the fixing of heating elements, changes on the shape and structure of bread vessel, changes on the fixing position of the motor and the mixing mechanism, and changes on the section shape of ring-shaped groove 31, made by technicians of the field may be employed without departing from the true spirit and scope of the present invention.

What is claimed is:

1. A breadmaker with a hidden heating element, comprising:
   a shell body;
   a case body (3) disposed inside the shell body;
   a lid disposed on a top of the shell body, wherein the lid, the case body and the shell body are enclosed to form a sealed bread-making chamber;
   a bread vessel (1) with an upper opening disposed inside the case body (3) in the bread-making chamber;
   a heating element (4) in a ring shape disposed outside the bread vessel, below the upper opening of the bread vessel, and surrounding the outside of the bread vessel (1) at a level between the bottom of the bread vessel (1) and its upper opening, wherein a joint (40) of the heating element (4) passes through the side wall of the case body (3) to connect with an external circuit;
   a shielding member for shielding the heating element, wherein the shielding member is disposed between the heating element and the upper opening of the bread vessel, wherein a downward projection of the shielding member completely covers a contour of the heating element so as to completely shield the heating element from a top view above the shielding member, wherein the shielding member is a ring shaped shielding protection plate (2) which is fixed on the inner wall of the case body (3), above the heating element (4) and surrounding the outside of the bread vessel (1), wherein a clearance is formed between an inner rim of the shielding protection plate (2) and the outer surface of the side wall of the bread vessel (1);
   a fixing plate (41) for fixing the heating element (4), wherein the fixing plate (41) is disposed on the inner side wall of the case body (3) at the place where the heating element joint (40) passes through; and
   at least one set of fixture for fixing the heating element (4), wherein the fixture set comprises a fixing metal sheet (42) in a shape of "Ω" and a fixing ceramic block (43), wherein the fixing metal sheet (42) is sleeved outside the heating element (4) and fixed on the case body (3), and the fixing ceramic block (43) is disposed between the heating element (4) and the inner surface of the side wall of the case body (3).

2. The breadmaker according to claim 1, wherein the heating element is selected from the group consisting of a heating tube, a quartz infrared tube, a ceramic heating tube and a PTC (Positive Temperature Coefficient) electric heater.

3. The breadmaker according to claim 1, wherein the shielding protection plate (2) comprises a horizontal ring sheet and a vertical ring sheet extending from the horizontal ring sheet to define a cross section of the shielding protection plate (2) in a shape of "L", wherein the vertical ring sheet is fixed on the inner surface of the side wall of the case body (3) by means of a plurality of bolts (21) and the horizontal ring sheet to completely covers the heating element (4) from a top view above the horizontal ring sheet.

4. A breadmaker with a hidden heating element, comprising:
   a shell body;
   a case body (3) disposed inside the shell body;
   a lid disposed on a top of the shell body, wherein the lid, the case body and the shell body are enclosed to form a sealed bread-making chamber;
   a bread vessel (1) with an upper opening disposed inside the bread-making chamber; and
   a heating element (4) in a ring shape disposed outside the bread vessel and below the upper opening of the bread vessel; and
   a shielding member shielding for the heating element, wherein the shielding member is disposed between the heating element and the upper opening of the bread vessel, wherein a downward projection of the shielding member completely covers a contour of the heating element so as to completely shield the heating element from a top view above the shielding member,
   wherein the bread vessel (1) is disposed inside the case body (3), and the heating element (4) is disposed surrounding the outside of the bread vessel (1) at a level between the bottom of the bread vessel (1) and its upper opening;
   wherein the shielding member is a ring-shaped groove (31) which is formed on the side wall of the case body (3) and bulges outwards therefrom, and the heating element (4) is inlaid in the ring-shaped groove (31); and
   wherein a horizontal groove depth of the ring-shaped groove (31) is larger than an outside diameter of the heating element (4).

5. The breadmaker according to claim 4, wherein the heating element (4) and the ring-shaped groove (31) are both on a horizontal plane.

6. The breadmaker according to claim 5, wherein the case body (3) is segmented into two portions of an upper case body (9) and a lower case body (10), and the ring-shaped groove (31) is formed on the lower case body (10) adjacent to the connecting position between the upper case body (9) and the lower case body (10).

7. The breadmaker according to claim 5, wherein a joint (40) of the heating element (4) passes through the side wall of the ring-shaped groove (31) to connect with an external circuit; a fixing plate (41) for the heating element (4) is disposed on the inner side wall of the ring-shaped groove (31) at the place where the heating element joint (40) passes through; and the breadmaker further comprises at least one set of fixture for the heating element (4); and the fixture set comprises a fixing metal sheet (42) in shape of "Ω" and a fixing ceramic block (43), wherein the fixing metal sheet (42) is sleeved outside the heating element (4) and fixed on the ring-shaped groove (31), and the ceramic block (43) is disposed between the heating element (4) and the inner side wall of the ring-shaped groove (31).

8. The breadmaker according to claim 6, wherein a joint (40) of the heating element (4) passes through the side wall of the ring-shaped groove (31) to connect with an external circuit; a fixing plate (41) for fixing the heating element (4) is disposed on the inner side wall of the case body (3) at the place where the heating element joint (40) passes through; and wherein the breadmaker further comprises at least one set of fixture for fixing the heating element (4), wherein the fixture set comprises a fixing metal sheet (42) in a shape of "Ω" and a fixing ceramic block (43), wherein the fixing metal sheet (42) is sleeved outside the heating element (4) and fixed on the case body (3), and the fixing ceramic block (43) is disposed between the heating element (4) and the inner surface of the side wall of the case body (3).

9. The breadmaker according to claim 4, wherein the heating element (4) and the ring-shaped groove (31) are both on an inclined plane which has an angle in a range of 5 to 60 degrees relative to a horizontal plane.

* * * * *